G. H. UNDERHILL.
SOUND REPRODUCING OR SOUND RECORDING MACHINE.
APPLICATION FILED MAY 6, 1905.
995,390.
Patented June 13, 1911.
6 SHEETS—SHEET 2.
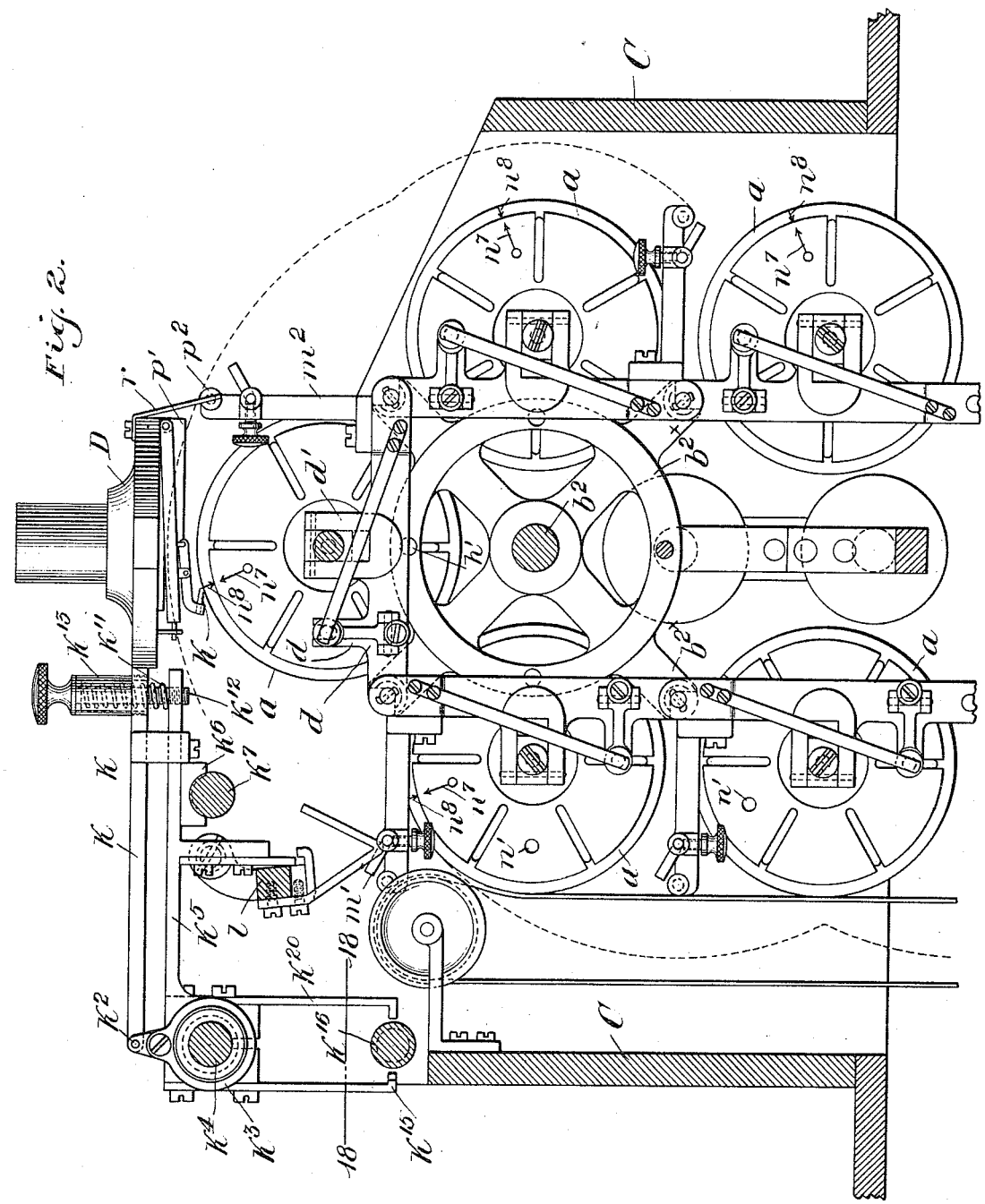
Witnesses:
Horace A. Crossman
Everett S. Emery
Inventor:
George H. Underhill
by Emery, Booth & Powell
Attys.

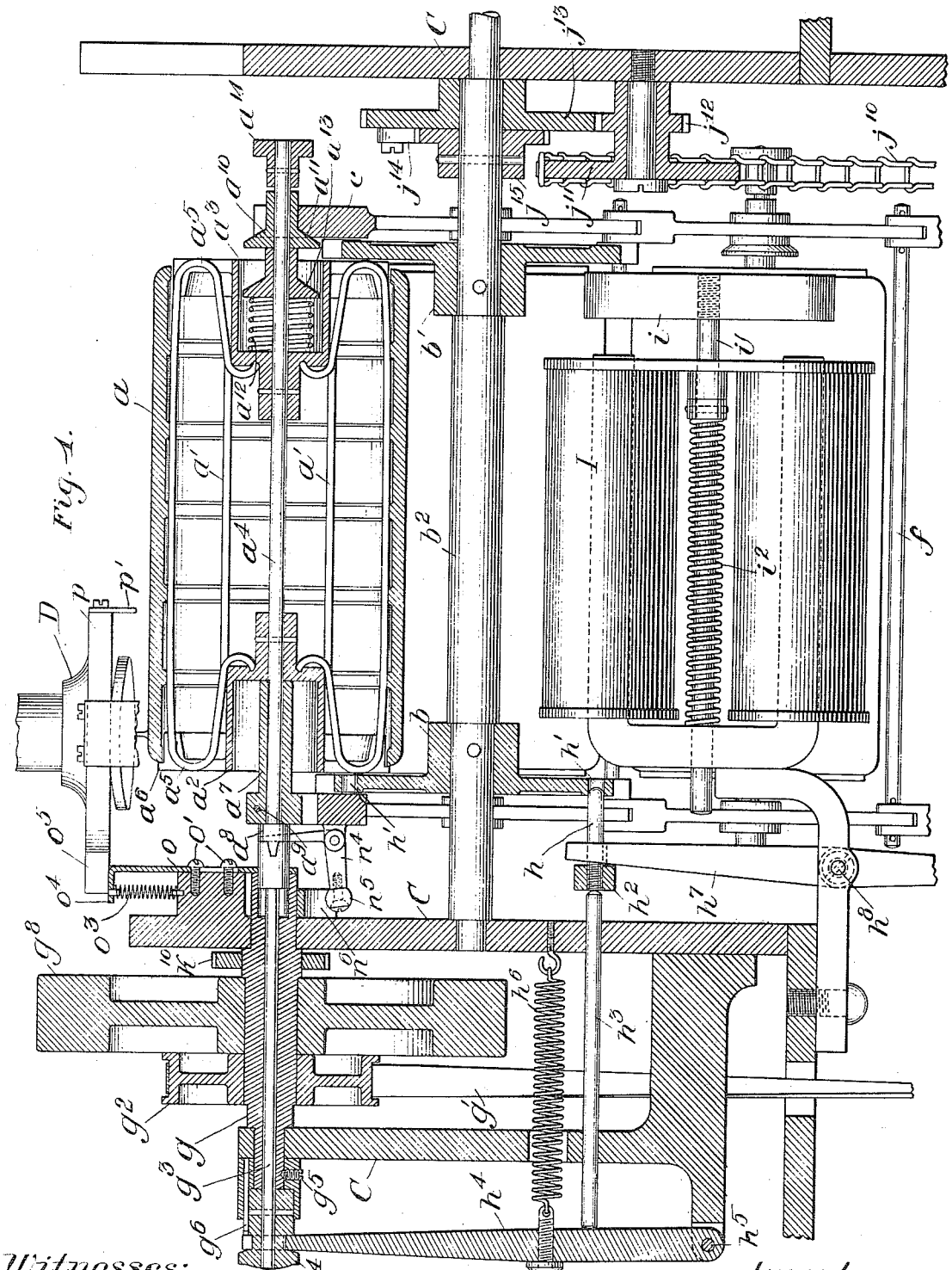

G. H. UNDERHILL.
SOUND REPRODUCING OR SOUND RECORDING MACHINE.
APPLICATION FILED MAY 6, 1905.
995,390.
Patented June 13, 1911.
6 SHEETS—SHEET 3.
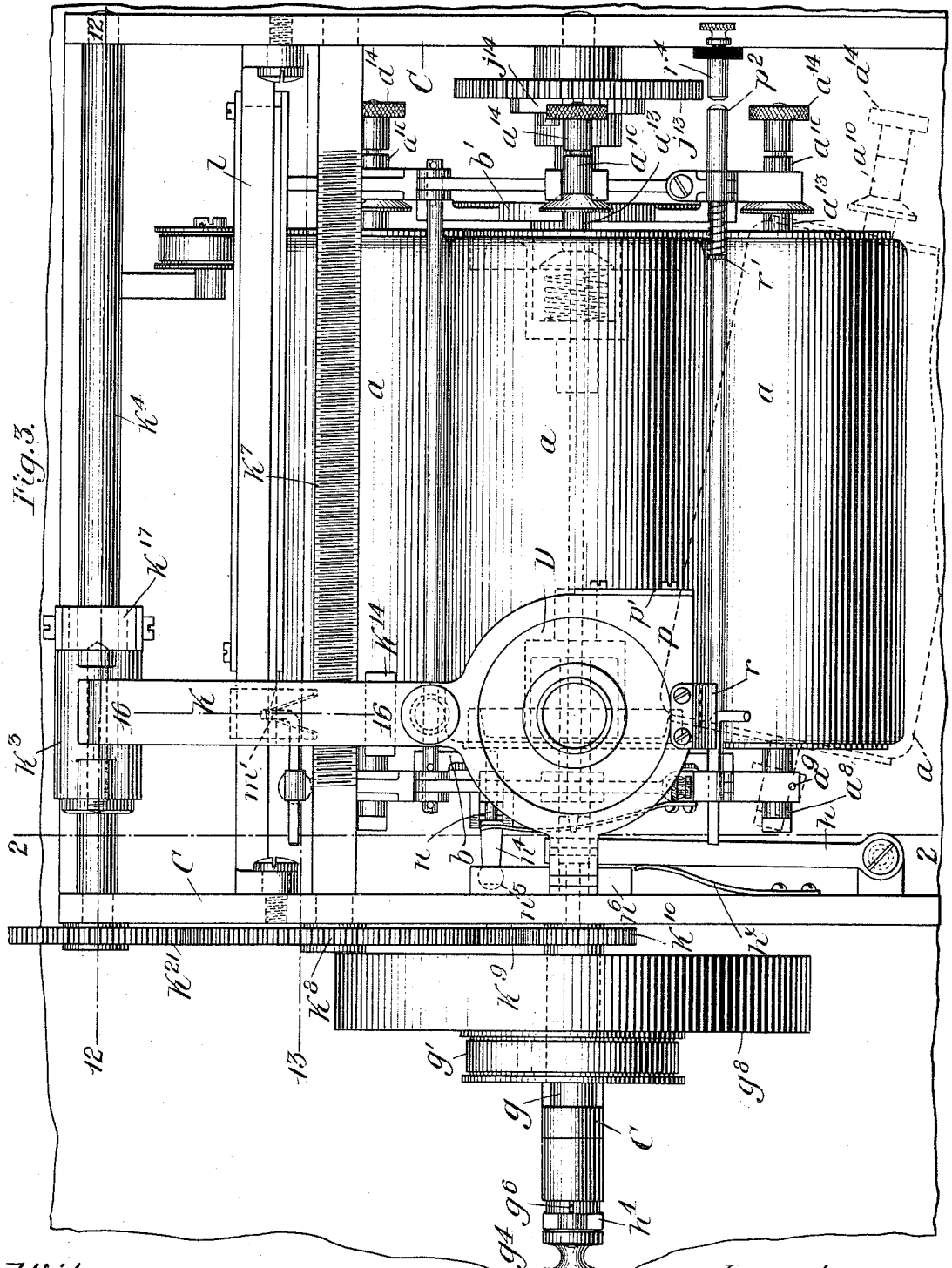
Witnesses:
Horace A. Crossman
Everett L. Emery
Inventor:
George H. Underhill,
by Emery Booth Powell
Attys.

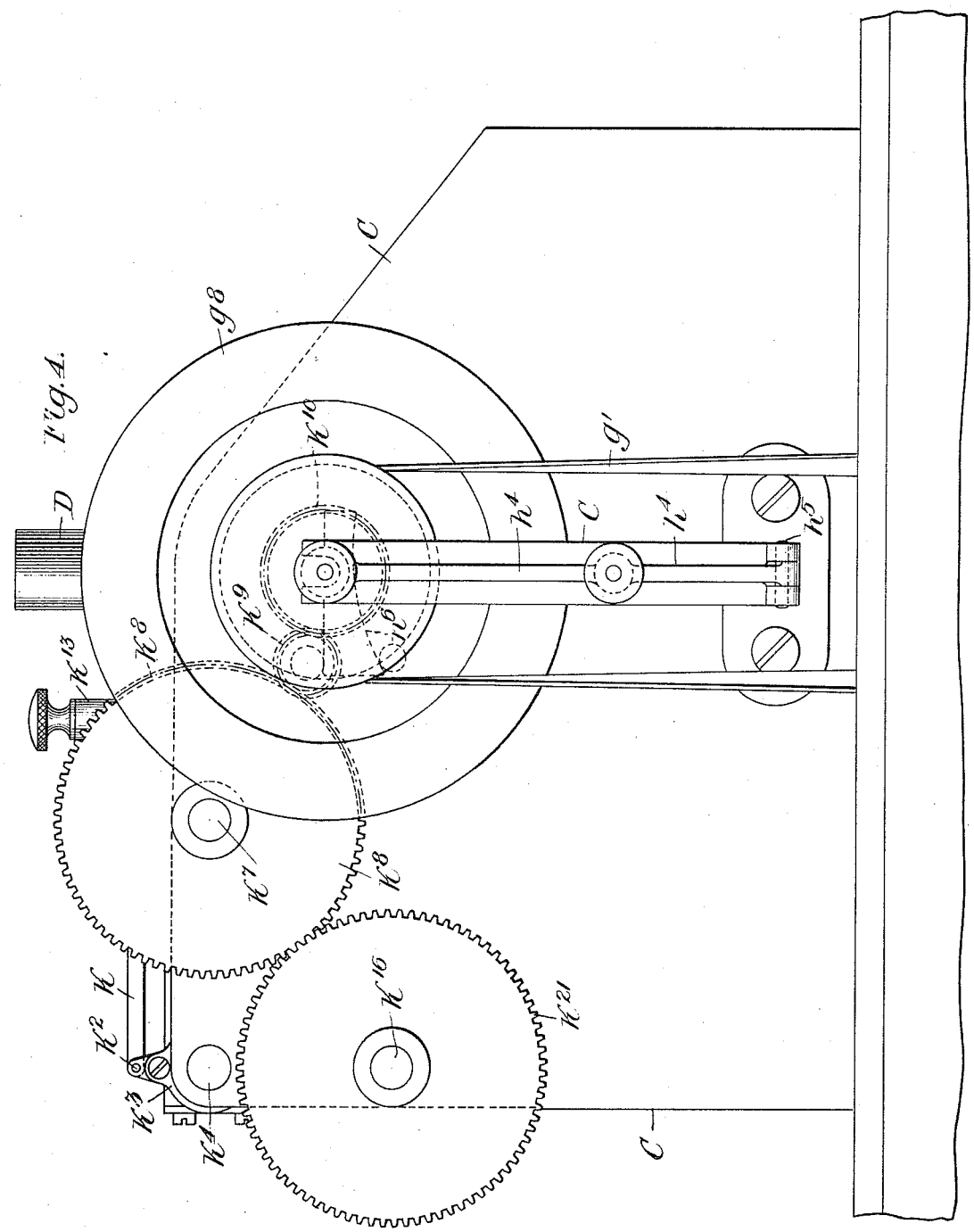

G. H. UNDERHILL.
SOUND REPRODUCING OR SOUND RECORDING MACHINE.
APPLICATION FILED MAY 6, 1905.
995,390.
Patented June 13, 1911.
6 SHEETS—SHEET 5.
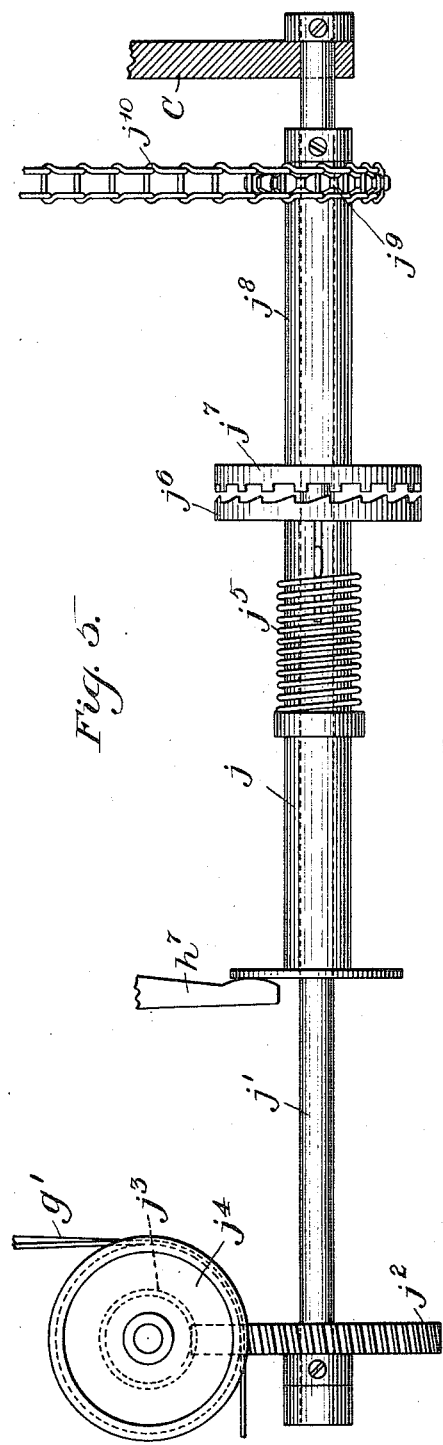
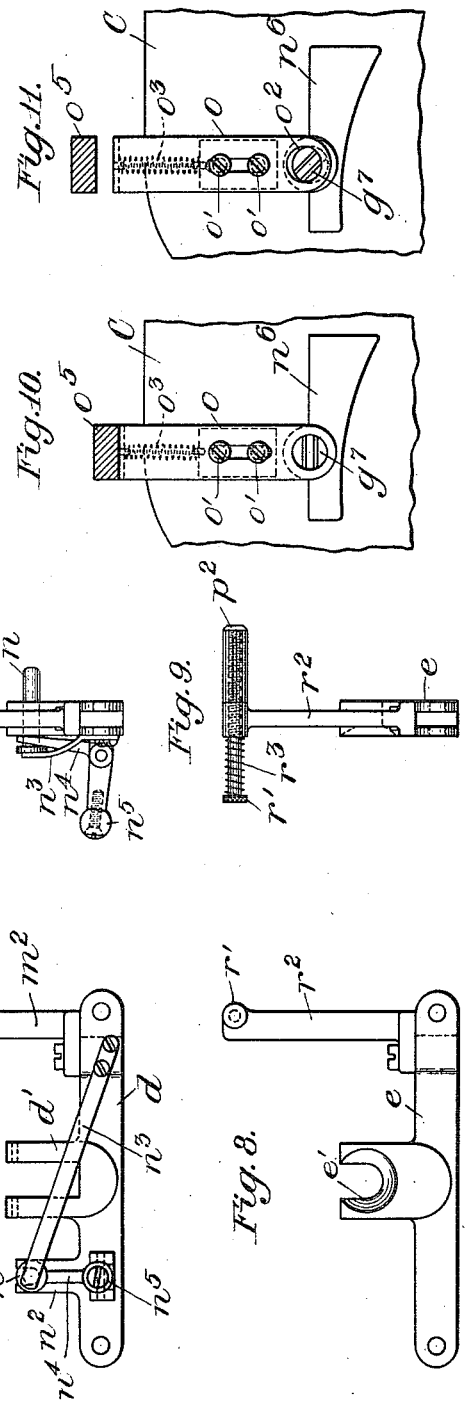
Witnesses:
Horace H. Crossman.
Everett S. Emery.
Inventor:
George H. Underhill.
by Emery, Booth, Powell
Attys.

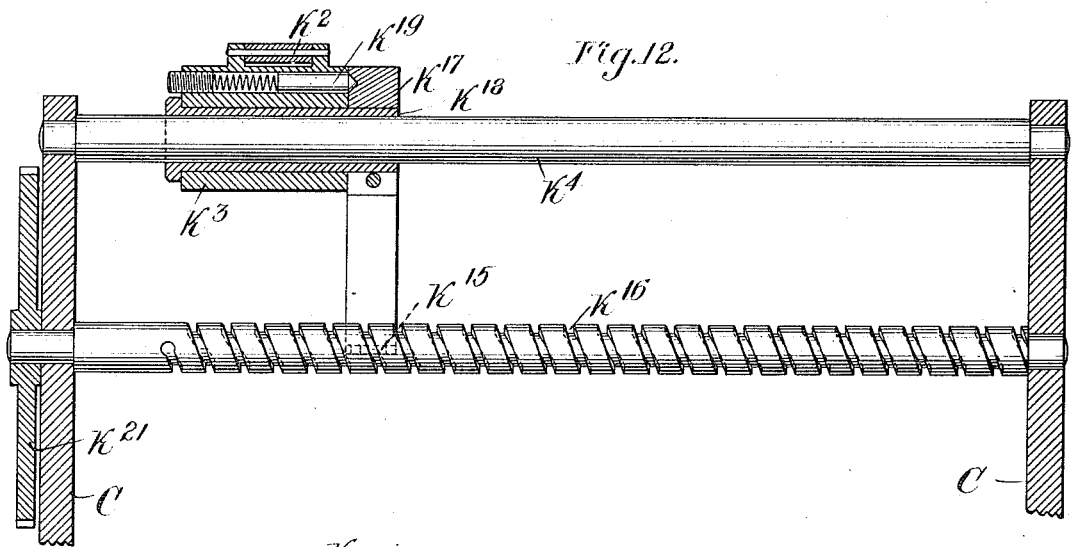
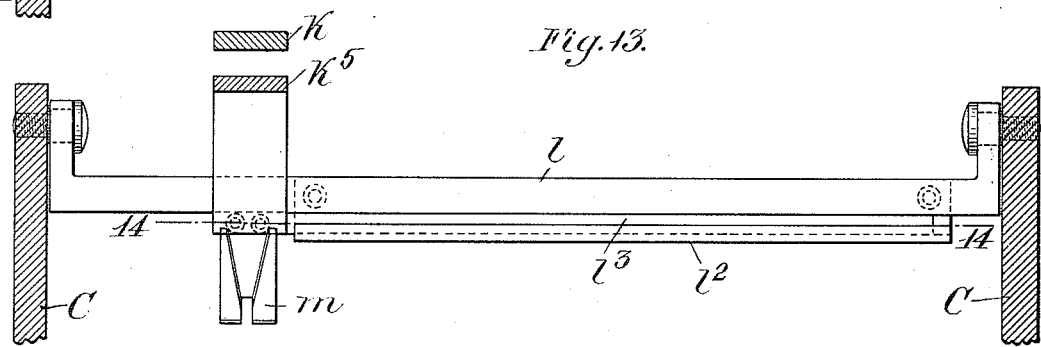
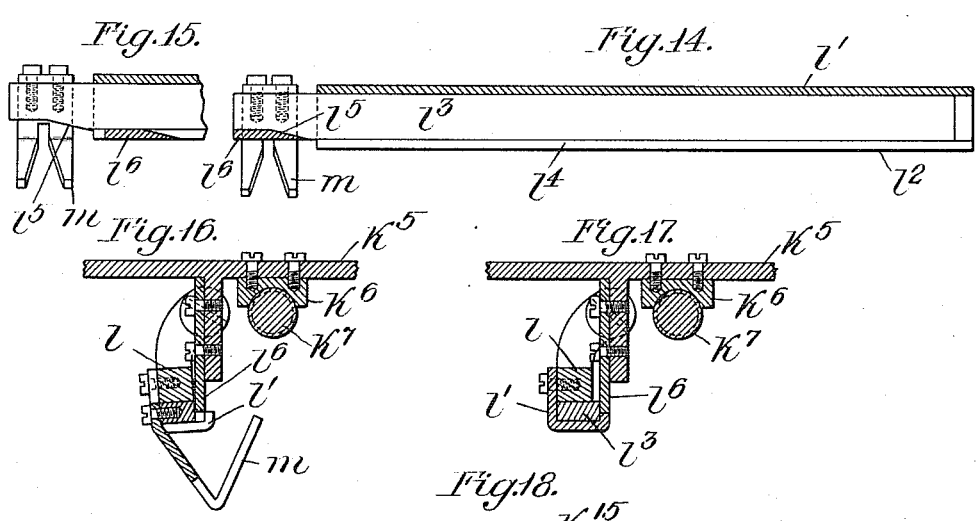

UNITED STATES PATENT OFFICE.

GEORGE H. UNDERHILL, OF BOSTON, MASSACHUSETTS.

SOUND-REPRODUCING OR SOUND-RECORDING MACHINE.

995,390.   Specification of Letters Patent.   Patented June 13, 1911.

Application filed May 6, 1905. Serial No. 259,107.

*To all whom it may concern:*

Be it known that I, GEORGE H. UNDERHILL, a citizen of the United States, residing at Boston, in the county of Suffolk and State of Massachusetts, have invented an Improvement in Sound-Reproducing or Sound-Recording Machines, of which the following description, in connection with the accompanying drawings, is a specification, like letters on the drawings representing like parts.

My invention consists in improvements in sound reproducing or sound recording machines.

Many features of my invention have a useful application to many different types of such machines, including single record machines, but my invention on the whole is particularly applicable, and is herein illustrated with reference, to one type of multiple record machine having a plurality of cylindrical records supported by a linked carrying member, such records being automatically and successively brought into reproducing or recording relation to suitable reproducing or recording mechanism, the latter being caused to automatically traverse the face of each record as the same is presented.

My invention will be best understood by reference to the following description taken in connection with the accompanying illustration of one specific embodiment, while its scope will be more particularly pointed out in the appended claims.

In the drawings,—Figure 1 is a central sectional elevation of a portion of a sound reproducing machine embodying one form of my invention; Fig. 2 is a side elevation partly in section showing the machine of Fig. 1; Fig. 3 is a plan view partially broken away of the machine shown in Figs. 1 and 2; Fig. 4 is an end elevation of the machine shown in Fig. 1 looking from the left; Fig. 5 is an elevation of the underlying sprocket-wheel driving shaft arranged on the central plane of the machine but omitted from Fig. 1 through lack of space; Figs. 6 and 7 show in side view and end elevation respectively the construction of the inside links of the record carrying member or those links at the left in Figs. 1 and 3; Figs. 8 and 9 show similar views of the outside links or those at the right Figs. 1 and 3; Figs. 10 and 11 are details showing in side elevation the sound box clutch controller in its clutched and unclutched positions respectively; Fig. 12 is a sectional elevation showing the construction of the sound box carriage and the return screw; Fig. 13 is a vertical section showing the depending sliding shoe at the end of the plate; Fig. 14 is a plan view in section on the line 14—14 of Fig. 13; Fig. 15 is a similar but fragmentary view showing the depending shoe during its return movement; Fig. 16 is a sectional elevation showing the shoe in a position corresponding to that shown in Fig. 14; Fig. 17 is a section showing the shoe in elevation in a position corresponding to that shown in Fig. 15; and, Fig. 18 is a section on the line 18—18, in Fig. 2, showing the construction of the nut which engages the sound box return screw.

In the drawings for illustrative purposes I have shown the various features of my invention embodied in a multiple record phonograph having (Figs. 1 and 2) a series of record cylinders $a$ journaled each upon the linked members of a pair of record-carrying chains passing over the separated sprocket wheels $b$ and $b'$ the latter fixed to rotate with the sprocket driving shaft $b^2$ which is mounted in the frame C of the machine, said records being brought one by one into an operative position beneath the sound reproducing mechanism D as the shaft $b^2$ is given an intermittent turning movement.

Referring first to the mounting of the individual records, there is provided an improved simple construction of support of minimum weight, but permitting the contraction of the record, under changes in temperature without fracture or other injury to the same, as well as the expansion of the record without loosening its grasp upon the support.

Referring more particularly to Figs. 1 and 2, support for the cylinder $a$ is afforded by a series of elastic members $a'$ arranged lengthwise the mandrel and radially with reference to the axis thereof, these being sufficient in number to accurately center the cylinder, while presenting to the core thereof a series of gripping members which are freely yieldable inwardly on contraction of the record.

One form of elastic mandrel is that illustrated in Fig. 1, the elastic members $a'$ being constructed of round elastic steel wires anchored or embedded in suitably positioned holes in the hub of the opposite but symmetrically arranged mandrel supports $a^2$, $a^3$, the latter being keyed to the record-turning shaft $a^4$. Before contacting with the core of the record cylinder $a$, they are caused to bow outwardly at $a^5$ into or through radially formed slits in the flanged portions of the supports $a^2$, $a^3$, which slits act to space and position the wires and to allow the ready yielding thereof under contraction of the record.

The record when slipped over the mandrel is self seating and will be firmly held thereon irrespective of its position and whether pushed on entirely or partially. This construction permits the record to be pushed to any predetermined position on the mandrel and there effectively retained, this being in contrast to prior forms of tapered mandrels where the record must be pushed to a seat upon its tapered support regardless of where that leaves the record lengthwise the mandrel. This permits a record to be played in the same position upon its support as it was cut and, after withdrawal to be replaced upon the same, or on a different mandrel, always in the same longitudinal position. For the purposes hereinafter referred to, on the illustrated machine the record is preferably pushed to a fixed position determined by the out-turned lip $a^6$ on the inner flanged support $a^2$.

A mandrel constructed as described may be relied upon to center the record cylinder with an accuracy sufficient for ordinary purposes, but, if desired, the flanged supports may be made to fit the outer ends of the record core with a small clearance, such, for example, as five one thousandths of an inch, so that no greater eccentricity can occur than that allowed by such clearance, which I have found negligible, while this allows for the necessary contraction of the record under changes of temperature.

For the best results, the records are preferably reamed at their inner ends, where they loosely fit the periphery of the flanged supports, to render the outer faces concentric with the inner bearing faces, thereby avoiding eccentricity in the record itself which I have found a common fault with commercial records.

The record turning shaft at that end which I term the inner end passes through the mandrel support $a^2$ and an elongated journal sleeve $a^7$ terminating in the suitably notched head $a^8$, which latter at the proper time is clutched by the record driving mechanism hereinafter described.

The sleeve $a^7$ is hinged or pivoted at $a^9$ between the arms of the upturned fork $d'$ (Figs. 2 and 6) in the link $d$ of the inner record-carrying chain or that passing over the sprocket $b$ (see Figs. 1, 2, 6 and 7) so that the mandrel and its record, when released at the opposite link, can be swung outwardly about the fulcrum, $a^9$ as is shown in dotted lines in Fig. 3.

The outer end of the turning shaft $a^4$ is journaled in the sliding collar $a^{10}$, fitting the open mouthed pocket $e'$ (Figs. 1 and 8) in the link $e$ of the outer chain, or that passing over the sprocket $b'$. The collar $a^{10}$ has a beveled shoulder $a^{11}$ which bears against the correspondingly shaped inner face of the pocket $e'$, being forced against the same by the pressure of the spiral retaining spring $a^{12}$ acting through the washer $a^{13}$. The bevel of the shoulder $a^{11}$ upon the collar $a^{10}$ is such that when the latter is seated in its pocket it is firmly held there by the spring $a^{12}$ and the mandrel is securely held in accurate alinement upon the chain carrier. If the overlying end of the turning shaft $a^4$, which can be readily and manually seized, is lifted away from the link, the beveled collar will snap out of its seat and the mandrel can be swung outwardly clear of the link $e$ for withdrawal of the record. The sleeve $a^{14}$, pinned to the shaft $a^4$ permits the collar a limited movement only, so that after effecting the desired change, when the shaft is again moved toward the link, the collar easily snaps into the pocket. Changes in the records will of course ordinarily be effected when the record is in an inoperative position, away from its position of engagement with the sound reproducing mechanism D.

The collar $a^{10}$ and the washer are made in separate pieces, as shown, for the purpose of retarding the rotation of the record by the friction of the engaging surface of these two parts sufficiently to avoid a rotary movement of the record under its own inertia.

The successive links of each chain are constructed alike, each link being forked at one end to receive the end of the next adjacent link, to which it is pivotally secured by the pivotal tie rods $f$, which pass entirely through from one chain to the other. Each sprocket is provided with four projecting teeth $b^{2x}$ (Fig. 2) which are suitably notched to receive the tie rods $f$, so that each link is supported by its sprocket at two points through engagement of the tie rods $f$ therewith and through engagement with such tie rods only.

Referring again to Fig. 1, the record driving or turning mechanism is carried upon the sleeve $g$, suitably journaled in the frame C and given a constant rotary movement through the belt $g'$ and the pulley $g^2$, the latter secured to the said sleeve to drive the same. The mandrel driving shaft $g^3$ which is clutched to the mandrel to drive the same, is slidably mounted within the sleeve $g$ and is pinned at its outer end to a grooved collar $g^4$. Movement is communicated from the driving sleeve $g$ to the mandrel driving shaft $g^2$ through the hollow coupling $g^5$ secured to the outer end of the said sleeve and provided with an internal key-way, with which engages a key $g^6$ upon the grooved collar $g^4$, permitting sliding movement of the latter while causing the rotation of the mandrel driving shaft $g^3$. The opposite end of the driving shaft $g^3$ is provided with a clutching head suitably notched to engage the correspondingly projecting head $a^3$ of the mandrel shaft $a^4$ when in the position shown in Fig. 1, but adapted to be withdrawn into a pocket formed in the end of the said sleeve $g$ when the collar $g^4$ is drawn outwardly to unclutch the mandrel shaft $a^4$ and permit the sprocket wheels to turn for shifting the records.

I have found a marked improvement in the quality of the sound reproduction when the rotative movement of the record is perfectly uniform and this I have also found can be attained by increasing the mass of the parts to give a fly wheel effect thereto. To this end I preferably make use of the balance wheel $g^8$ of relatively great mass compared with that of the record and here shown secured to the driving sleeve $g$ to rotate therewith and impart thereto a steadiness and uniformity of movement.

At each shifting of the records it is necessary that the record carrier should be positively and correctly alined with reference to the sound reproducing mechanism and I have therefore provided the machine with a locking and alining means comprising the locking pin $h$ (Fig. 1), which is adapted to enter one of the four properly positioned holes $h'$ (Fig. 2) in the sprocket when the latter is turned to bring a fresh record in its correct position and there lock the same until the pin $h$ is again withdrawn. The pin $h$ is carried (Fig. 3) by the horizontal swinging locking bar $h^2$ pivoted to the frame of the machine, the device $h$ being pressed toward the face of the sprocket by the pressure of the leaf spring $h^x$ acting against the bar $h^2$.

Pressing against the bar $h^2$ (Fig. 1) is the horizontal sliding rod $h^3$ contacting at its outer end with the side of the upright arm $h^4$ pivoted to the machine frame at $h^5$ and pressed constantly against the rod $h^3$ by the adjustable spiral tension spring $h^6$. The free upper end of the arm $h^4$ is forked and embraces the groove in the overhead collar $g^4$ on the driving shaft $g^3$, whereby an outward swinging movement of the arm will cause retraction of the sliding driving shaft and the disengagement of the head $g^7$ from the mandrel shaft.

After a record has been played suitable controlling means are automatically actuated, causing simultaneous disengagement of the locking pin $h$, from the sprocket and the clutching head $g^7$ from the mandrel turning shaft and effecting at the same time the turning of the sprockets to shift the records. This operation may be effected in a great variety of ways, but as illustrative of one embodiment of my invention, I have shown the electromagnet I located beneath the sprocket shaft. On the completion of the playing of a record the electro-magnet is energized through means hereinafter described, causing the attraction of the armature $i$ attached to the sliding rod $i'$, the said armature being normally held away from the poles of the magnet by the compression spring $i^2$. This causes the opposite end of the sliding armature rod $i'$ to contact with the upright lever $h^7$ pivoted on the machine frame at $h^8$ and to swing the free end of the upright lever against the horizontal locking bar $h^2$ causing the withdrawal of the latch $h$ from the sprocket and causing at the same time the outward movement of the sliding rod $h^3$ against the vertical swinging lever $h^4$ simultaneously to unclutch the driving shaft $g^3$ and free the mandrel preparatory to the movement of the sprocket.

Referring now to Fig. 5 the lower end of the upright lever $h^7$ bears against a flange on the rotary sleeve $j$ pinned to but slidable on the shaft $j'$, which is journaled in the machine frame beneath the magnet I and is given a constant rotary movement by means of the worn gear $j^2$ and the worm $j^3$, the latter being driven by the pulley $j^4$ over which passes the belt $g'$ carried to and driven by a spring motor (not shown) or any other suitable source of motive power. When the lever $h^7$ is swung about its fulcrum by energization of the magnet as described, its lower end forces the sleeve to the right as viewed in Fig. 5 against the opposing pressure of the spring $j^5$ causing the toothed clutch disk $j^6$ to engage a similar tooth disk $j^7$ on the loose sleeve $j^8$. The latter carries a sprocket wheel $j^9$ and acts, on engagement of the clutch disk, to rotate the overhead sprocket wheel $j^{11}$ (Fig. 1) through the driving chain $j^{10}$. The sprocket wheel $j^{11}$ is fast on a sleeve carrying also the pinion $j^{12}$ the latter engaging the gear $j^{13}$ loose on the main sprocket shaft $b^2$ but carrying the pawl $j^{14}$ which bears against the teeth of the gear $j^{15}$ to turn the latter and thereby the main sprocket shaft when the two clutch disks are engaged as described.

Although the magnet I is deënergized immediately after the beginning of the record-shifting movement the retracted latch pin $h$ which continues to be pressed out by the face of the moving sprocket $b$, holds the driving shaft $g^7$ retracted and the clutch disks $j^6$ and $j^7$ engaged until the next record is brought into a position of alinement, when the pin finds and enters the next alining hole $h'$ locking the sprocket in its correct position and at the same time releasing the lever $h^7$ to permit the unclutching of the disks $j^6$ and $j^7$ which follows under the action of the spring $j^5$, and also releasing the swinging arm $h^4$.

During the shifting of the records the stylus which has been automatically lifted from the face of the record, is traversed back to its initial position and again dropped into engagement with the record at the beginning of the record groove.

The sound box D may be of any suitable construction being provided with the usual diaphragm and attached stylus K, the latter positioned for engagement with the record groove. The sound box D is supported at the end of the horizontal arm $k$, which is pivoted at $k^2$ to the sliding sound box carrier $k^3$, the latter (Figs. 2, 3 and 12) being slidable along the rod $k^4$ at the rear of the machine. The carrier $k^3$ is traversed in its advance or reproducing movement by means of the forwardly projecting horizontal arm $k^5$, attached to the carrier and provided near its forward end with the segmental nut $k^6$, which engages with the upper face of the finely threaded screw $k^7$. The feed screw $k^7$ is constantly rotated to advance the stylus when the nut $k^6$ is in engagement with said screw by means of the gear $k^8$ (Figs. 3 and 4) secured at the end thereof and outside the machine casing; the gear $k^8$ being driven through the idler $k^9$ and the driving feed pinion $k^{10}$; the latter (Fig. 1) being mounted directly on the driving sleeve $g$.

The sound box is given an adjustable spring support upon the arm $k^5$ through the intervention of the spiral spring $k^{11}$. The latter rests upon the arm $k^5$ about the threaded stud $k^{12}$ and is carried in the hollow cap $k^{13}$ which is adjustably threaded into the arm $k$, whereby turning of the cap will adjust the sound box relatively to the arm $k^5$. A forked guiding piece is secured to the arm $k^5$ and with its upturned ears embraces the arm $k$ to prevent lateral displacement thereof.

When the sound box reaches the end of the record it is automatically lifted, as will be described, and this causes withdrawal of the nut $k^6$ from the feed screw $k^7$, the stoppage of the advance feed and at the same time the engagement of the depending segmental nut $k^{15}$ with the coarse threaded return feed screw $k^{16}$ at the rear of the machine and beneath the carrier shaft $k^4$. The nut $k^{15}$ (Figs. 2, 12 and 18) is secured to the overhead collar $k^{17}$, fast to the sleeve or bushing $k^{18}$, slidable along the shaft $k^4$ and loosely fitted within the carrier $k^3$.

The normal position of the nut relatively to the carrier $k^3$, which is shown in Fig. 2, is maintained by the spring pressed pin $k^{19}$, the pointed end of which fits a correspondingly shaped depression in the opposing face of the collar, the bevel of the pin point, however, being such that the carrier may be turned relatively to the collar and the pin snapped away from its seat, thus permitting the sound box with its arm and feeding nut $k^6$ to be swung upward and backward out of the way for inspection of the machine or for any other purpose, while still leaving the nut $k^{15}$ depending in the position shown in Fig. 2. When the sound box is swung forward again into position, a positioning arm $k^{20}$ also depending from the collar $k^{17}$ holds the latter in substantially its normal position until the pin $k^{17}$ snaps into its seat in the collar.

The spring-pressed pin $k^{19}$ also assists in enforcing engagement of the nut $k^{15}$ with the return feed screw $k^{16}$, for, if the threads of the screw are not in such a position as to permit the nut to drop into the same when the stylus is lifted from the record, the pin $k^{19}$ is forced against its spring and the pressure thereof tends to force the nut into engagement as soon as the screw turns far enough to permit this.

The coarse threaded return feed screw $k^{16}$ is given a movement the reverse of the advance screw $k^7$ by means of engagement between the gear $k^{21}$ (Figs. 3 and 4) fast upon the screw $k^{16}$ and the gear $k^8$ upon the advance feed screw $k^7$.

An important feature of my invention is the provision of means whereby the stylus may be dropped into the first groove at the commencement of reproduction and whereby this is accomplished with each of the records of the series irrespective of differences in the cutting of the records, also in the provision of means for raising the stylus from the record immediately after the last note is played and with each record of the series. This not only insures the elimination of the hissing noise usually preceding and following the playing of a record, but also avoids the unnecessary lapse of time between the playing of the records.

The controlling device for dropping the stylus on its return movement at the appropriate time and place is carried by a swinging stirrup $l$ (Figs. 1 and 13 to 17) extending across the machine and pivoted by its upturned ends to the frame thereof. To this stirrup is secured the guide plate $l'$ of an L shaped section having the upturned lip $l^2$ and supporting the sliding controlling plate $l^3$, the latter having a straight vertical front edge $l^4$ for a greater portion of its length, but terminating at one end in the beveled recessed portion $l^5$.

Fixedly secured to the feeding arm $k^5$ is the depending controlling shoe $l^6$ so positioned that during the advance of the stylus the straight edge of the controller plate $l^3$ lies against the side of the shoe near its lower edge, as shown in Fig. 17.

When the stylus reaches the end of the record, however, and is lifted, the shoe $l^6$ is raised clear of the plate $l^3$, and the latter, carried by the swinging stirrup gravitates beneath the lower edge of the shoe so that when the stylus is released by the lifting mechanism the shoe is deposited and caused to return upon the upper face of the plate $l^3$ near its outer edge, the sound box being thereby sustained at such an elevation as to cause the stylus to clear the record and the nut $k^6$ to be disengaged from the advance feed screw $k^7$. At the instant when the shoe reaches the recessed portion $l^5$ upon the plate it drops into such recessed portion (see Figs. 14 and 16), lowering the stylus, disengaging the nut $k^{15}$ from the return feed screw, and again starting the advance of the reproducing mechanism. The advanced edge of the shoe is beveled to correspond to the bevel $l^5$ upon the plate and as the shoe advances with the sound box it swings the plate with its stirrup back from the position shown in Fig. 14 to that shown in Fig. 15, so that it assumes the position shown in Fig. 17 during the reproduction of the record. The position of the sliding plate $l^3$ therefore determines the dropping of the stylus and this I have rendered automatically adjustable with respect to the commencement of the record groove in each individual record of the series so that wherever the groove starts relatively to the end of the record the stylus will there be dropped and at no other place. This is effected by the V-shaped controller positioning device $m$ having a flared opening positioned approximately in the path of travel of the outturned end of the series of pins $m'$, the latter being adjustably secured to the upright arm $m^2$ upon each of the record-carrying links $d$ (Fig. 6). The pin $m'$ may be secured in its link by any suitable means, as by the set screw $m^3$ and there accurately adjusted with reference to the commencement of the sound groove of that record which is carried by the next succeeding link. As the records are shifted, the positioning pin upon the link which is carrying its record out of operative position is caused to sweep through the flared opening of the positioning device and center the said device in its line of travel, thereby positioning the controlling plate $l^3$ so as to drop the stylus exactly in the commencement of the groove of the next record.

By previously adjusting the positioning pin $m'$ corresponding to each record with reference to the first groove therein, the stylus will be dropped into the first groove of each record when the latter is presented to the sound reproducing mechanism, irrespective of variations in the cutting of the different records and, no matter how often the records are reproduced or are withdrawn from and replaced upon their mandrels.

In the illustrated machine there is provided not only the described means for dropping the stylus into the first groove of the record, but also for dropping the stylus into the beginning of that groove. For this purpose the records advancing toward the operative position are held against rotation by mandrel-locking means and presented to the stylus with the beginning of the record groove directly beneath the line of travel of the stylus, the lock being then withdrawn to permit rotation of the record, which follows as soon as the stylus is lowered.

The mandrel locking means comprises a locking pin $n$ (Figs. 3 and 7) carried by the link $d$ and adapted to enter a locking recess $n'$ in the inner face of the flanged mandrel support $a^2$. The pin $n$ is slidably mounted in the upright member $n^2$ of the link $b$, being pressed toward the mandrel by the leaf spring $n^3$. The locking pin $n$ is withdrawn from the mandrel as the record reaches its uppermost and operative position, by the forked end of the bell crank lever $n^4$ pivoted to the side of the link, the withdrawal of the link being effected by contact between the opposite spherical end $n^5$ of the lever arm and the under face of the stationary cam $n^6$ (Figs. 1, 4, 10 and 11) secured to the inner side of the machine frame. As the record moves into operative position, the spherical head rides upon the cam, causing the latter to withdraw the locking pin and free the mandrel for rotation, the latter, however, being still positioned against accidental movement by the friction between the collar $a^{11}$ and the washer $a^{13}$.

The mandrel is provided with a reference or index mark, such as the zero mark, $n^7$ (Fig. 2), and each record after being cut, is provided with a corresponding reference mark $n^8$, alining with the beginning of the record groove. The mandrel index mark is so located with reference to the locking recess $n'$ that when the record is pushed upon the support with its reference mark registering with the reference mark upon the mandrel, the locked mandrel will bring the first part of the groove, directly beneath the line of travel of the stylus.

After a record is played the record may be restored to its zero position and there locked in any desired way, but in the described embodiment of my invention I have provided the friction band $n^9$ against which the records contact as they travel away from the operative or reproducing position. By this contact they are turned slightly at each record shift and in the course of its intermittent turning each record will finally be locked in its zero position by the locking pin $n$ finding its locking hole in the mandrel flange.

The timing of the movements is preferably such that the record shifting is completed before the stylus returns to the dropping point however far from the initial position of the record its groove begins. In order to prevent the record from being turned during the interim, I have provided the slidable locking plate $o$ (Figs. 1, 10 and 11), which prevents the clutching movement of the driving shaft $g^3$, even though the latter be released by movement of the locking bar $h^2$, until the stylus is dropped for engagement with the record. The plate $o$ is slotted to slide with a limited movement upon the pins $o'$, and has an opening $o^2$, which in the lowermost portion of the plate registers with the clutch head $g^7$. The plate $o$ is normally pressed upward, and toward the position shown in Fig. 11, by the spring $o^3$, located between the frame of the machine and the overturned end $o^4$ of the plate, but is pressed downward into the position shown in Fig. 10, by the overhanging lug $o^5$, upon the sound box D, when the latter is lowered as indicated in Fig. 1. When the clutch head $g^7$ is retracted to release the mandrel preparatory to the shifting movement, the plate moves upward, locking the clutching head in its pocket from which it cannot emerge until the plate is pushed downwardly by the weight of the sound box as the stylus is lowered. When the stylus drops into the record groove, the released clutching head engages the mandrel and the latter, on account of the relatively great inertia of the fly wheel $g^8$, immediately assumes the uniform speed of the latter.

To withdraw the stylus from the record, the sound box D is provided with the overhanging extension $p$, to the advanced face of which is secured the depending plate $p'$ (Figs. 1 and 3), the lower edge of the latter being engaged and raised by a lifting pin $p^2$, one of which is carried by each of the outer carrying links $e$. As soon as the shifting movement of the sprocket begins, the lifting pin, which has a line of travel indicated by dotted lines in Fig. 2, meets the lower edge of the plate $p'$ and raises the stylus, the controller plate $l^3$ thereupon swinging under the shoe $l^6$. After the sprocket is turned and the pin withdrawn from the plate $p^2$, the shoe $l^6$, resting upon the controller plate, supports the sound box during its return movement.

In order that the record shifting movement, and, therefore, the withdrawal of the stylus, may take place immediately on the completion of the last note of the record, the traveling sound box is provided (Figs. 2 and 3) with the depending stop finger $r$, which, just before the completion of the record, is caused to meet the end of the adjustable and yieldable stop pin $r'$. The latter (Figs. 8 and 9) is threaded into the lifting pin $p^2$ and slidable in a head formed upon the upright arm $r^2$ at the rear end of the link $e$. The pin $r'$ is normally pressed outward, as shown in Figs. 3 and 9, by the spring $r^3$, but, when engaged by the finger $r$, is moved with the sound box to cause contact between the lifting pin $p^2$ and the stationary contact pin $r^4$, attached to but insulated from the frame of the machine. The stationary contact is connected through circuits (unnecessary to show) with the magnet I and a suitable source of current, the other terminal of the circuit being grounded to the frame of the machine, so that, on contact between the contact $r^4$ and the pin $p^2$, which latter is of conducting material, the circuit is completed and the magnet energized for starting the shifting movement, as has been described. Upon withdrawal of the pin $r'$, the latter again assumes the position shown in Fig. 3, thereby deënergizing the magnet.

The threaded adjustment of the pin $r'$ within the locking pin $p^2$, permits the adjustment of the former with reference to the termination of the record groove in each individual record, so that the closure of the controlling circuit will take place at the proper instant in the travel of the stylus to withdraw the latter from the record when the last note has been played.

In the machine described the playing of the records follow one another rapidly in succession with no other interval than that required for the return of the stylus. The coarse threaded screw shown may be relied upon to return the stylus with sufficient rapidity for ordinary purposes but my invention is not necessarily limited to the specific form of stylus return mechanism shown and if a still quicker return is desired other means for effecting this may be employed.

It will of course be understood that many features of my invention herein described are applicable to types of sound reproducing or sound recording machines other than the one which is here taken for purposes of illustration, and that such features of my invention either modified or as described, may be applied to such machines without reference to the presence or absence of the remaining features of said invention. It will also be understood that while I have described with considerable detail for illustrative purposes one practical embodiment of my invention, the same is not limited to the details described, or the form, relation, or construction of parts, but that many and wide modifications may be made therein without departing from the spirit of my invention.

It is also to be understood that, while the illustrated machine employs a traveling stylus with a stationary record support, and adjustment of the engagement between the stylus and the record is attained by adjusting or regulating the movement of the stylus, the reverse of these relations and conditions, as well as variations and modifications in the means by which the object is attained, are within the scope of my invention; it being obvious, for example, that the stylus might remain stationary and the record caused to travel.

Furthermore, although the machine illustrated is capable of and may be employed for regulation of the stylus movement to engage the record at the beginning of the groove thereof and withdraw therefrom at the end of the groove, my invention is not limited to the attainment of that precise condition; the engagement with the stylus may occur before the beginning of the groove and disengagement take place after the ending of the groove, it being within the scope of my invention to regulate the action of the stylus upon the record in any desired way with reference to the character of the groove impressed thereon.

I claim—

1. A multiple record sound-reproducing machine having means providing for a period of stylus engagement with the individual records proportioned in each case to the length of the sound groove therein.

2. A multiple record sound-reproducing machine having means providing for a period of stylus engagement with the individual records thereof automatically proportioned in each case to the length of the respective records.

3. A multiple record sound-reproducing machine employing a stylus and having a stylus controller, means for presenting to the stylus in succession the individual records of the machine, the control of the stylus by the said controller being dependent upon the location on the record of the beginning of the record groove or impression.

4. A multiple record sound-reproducing machine employing a stylus and having a stylus controller, means for presenting to the stylus in succession the individual records of the machine, the control of the stylus by the said controller being dependent upon the location on the record of the ending of the record groove or impression.

5. A multiple record sound-reproducing machine employing a stylus and having a stylus controller, means for presenting to the stylus in succession the individual records of the machine, the control of the stylus being dependent upon the differing character of the record groove or impression in the respective records.

6. A multiple record sound-reproducing machine having means for throwing the stylus in and out of engagement with the record, and means automatically adjustable with reference to each record for causing engagement thereof at the beginning of the record groove.

7. A multiple record sound-reproducing machine having means automatically to adjust the engagement of the stylus with the separate records with reference to the beginning of each record groove.

8. A multiple record sound-reproducing machine having a record-carrier, a stylus, and means upon said carrier for each of the several records thereof to determine the travel of the stylus for its respective record.

9. A multiple record sound-reproducing machine having a stylus and adjustable stylus-controlling means for each of the several records thereof.

10. In a multiple record sound reproducing machine the combination with a movable record carrier of means for causing the withdrawal of the stylus from the record on movement of said carrier and means adjustable for individual records for setting the carrier in motion.

11. In a reproducing machine having a movable record carrier for bringing successive records into position, means depending upon the character of each individual record for moving the carrier.

12. In a multiple record sound-reproducing machine, the combination with a movable record-carrier, and means for the several records adjustable each with reference to the ending of its respective record groove for setting said carrier in motion.

13. In a multiple record sound-reproducing machine, the combination with a movable record-carrier, of means for causing the withdrawal of the stylus from the record on movement of said carrier, and means for each record thereof adjusted with reference to the ending of its record groove for setting the said carrier in motion.

14. In a multiple record sound-reproducing or sound-recording machine, the combination with a stylus, a plurality of rotatable records, and means for presenting each record for successive engagement with the stylus in a predetermined position upon its support.

15. A multiple record sound reproducing machine having a plurality of rotatable records adapted for successive engagement with the sound reproducing mechanism, and means for holding the records against rotation prior to engagement with the sound reproducing mechanism.

16. A sound-reproducing or sound recording machine having a rotatable record, means for holding the record against rotation, and means for automatically releasing the same for rotation.

17. A multiple record sound-reproducing or sound-recording machine having a plurality of rotatable records, means for holding the records against rotation, and means for releasing the same prior to engagement with the stylus.

18. A multiple record sound-reproducing machine having a plurality of rotatable records, means for presenting each record for successive engagement with the stylus in a predetermined position upon its support, and means for restoring the record to its predetermined position before reëngagement with the stylus.

19. A multiple record sound-reproducing machine having a plurality of rotatable records, means for locking the several records against rotation prior to engagement with the stylus, means for releasing the same, and means for re-locking the said records before reëngagement with the stylus.

20. A multiple record sound reproducing machine having means for automatically varying the position of stylus engagement for successive records.

21. A multiple record sound reproducing machine having means for automatically varying the position of stylus disengagement for successive records.

22. A multiple record sound-reproducing machine having means for varying in consecutive records and with reference to the character of the successive sound records the position of stylus engagement or disengagement on the record, and means for presenting to the stylus in succession the individual records of the machine.

23. A multiple record sound-reproducing machine having record turning means, means for causing engagement between said turning means and successive records, and means for preventing engagement of said turning means with a freshly presented record prior to engagement of the stylus therewith.

24. A multiple record sound reproducing machine having record turning means, means for controlling disengagement of said turning means from the record with reference to the beginning of the record shifting movement, and means for controlling the engagement thereof with the record with reference to the point of engagement of the stylus therewith.

25. A multiple record sound reproducing machine having a plurality of records, record turning means adapted while in motion for engagement therewith and disengagement therefrom and a member of relatively great mass rotatable with said record driving means.

26. A multiple phonograph having a linked record carrier and stylus positioning means upon the individual links thereof.

27. A multiple phonograph having a linked record carrier and stylus withdrawing means upon the individual links thereof.

28. A multiple phonograph having a record carrier for shifting the records and means movable with the carrier for controlling the record shifting movement of the carrier.

29. A multiple phonograph having a linked record carrier and adjustable means for controlling the shifting movement of the records upon the links thereof.

30. A multiple phonograph having a linked carrier comprising pairs of oppositely arranged links, a hinged record support upon one link and an open-ended pocket in the opposite link.

31. A multiple record sound reproducing or recording machine, having a plurality of record supports, a fly wheel and means for attaching the fly wheel to and detaching it from the individual record supports.

32. A multiple record phonograph having a plurality of skeleton record supports, driving means, and a fly wheel connected with said driving means and adapted to be connected to and disconnected from the individual record supports.

33. A sound reproducing machine having a sound box, means for advancing the sound box and means for returning the same, and a yieldable connection between said advancing and return means.

34. A sound reproducing machine having a sound box, an advancing feed screw, a return feed screw, a member attached to said sound box engaging said advancing feed screw, another member also attached to said sound box for engaging said return feed screw, and a yieldable connection between said members.

35. A sound reproducing machine having a traveling sound box and a swinging support therefor attached to the machine and means attached to said sound box for engagement with said support, said support being adapted to swing beneath said engaging means when the sound box is lifted.

36. A sound reproducing machine having a sound box and a swinging gravity actuated support for said sound box adapted to act when the sound box is lifted.

37. A phonograph having a stylus, a controller comprising a sliding controlling plate and a swinging support therefor.

38. A multiple record sound-reproducing or sound-recording machine having means for throwing the stylus in and out of engagement with the record, means for presenting successive records in operative relation to the stylus, and differential means for causing engagement of said stylus with the successive records at the beginning of the record groove and disengagement therefrom at the end of the record groove.

39. A sound-reproducing machine having sound-reproducing mechanism, means for presenting to the said mechanism a succession of records, and differential means for disengaging the sound-reproducing mechanism in each case from the record at the end of the record groove.

40. A sound-reproducing machine having sound reproducing mechanism, means for presenting to said mechanism a succession of records, and differential means for engaging said mechanism in each case with the record at the beginning of the record groove.

41. A multiple record sound reproducing machine having a plurality of records, each provided with an identifying mark, a mandrel having also an identifying mark whereby the record may be placed thereon in a predetermined position, a stylus, and means for presenting said records in succession to said stylus, means for lowering the stylus upon the record, and means for simultaneously starting the rotation of the record.

42. A multiple record sound reproducing machine having a plurality of records having each an identifying mark placed for the determination of the beginning of the record groove, means for holding each record against rotation prior to the engagement of the stylus therewith, and means for presenting said records successively to the stylus.

43. A sound reproducing machine employing a grooved record, a traveling sound box provided with a stylus, means for lowering the sound box and stylus at a point determined with reference to the beginning of the record groove, and means for presenting the record for engagement with the stylus in a predetermined position upon its support.

44. A multiple record sound reproducing machine having sound reproducing mechanism, a plurality of records, means for presenting them successively to the action of the sound reproducing mechanism, means for holding each record against rotation prior to its presentation to the sound reproducing mechanism, and means for releasing the same prior to the engagement of the sound reproducing mechanism therewith.

45. A multiple record sound reproducing machine having a stylus, a plurality of records, means for presenting said records successively for engagement with said stylus, and means to cause disengagement of the stylus from the records at variable points in the path of stylus travel.

46. A multiple record sound reproducing machine having a stylus, a plurality of records, means for presenting said records in succession for engagement with said stylus, and means for causing engagement of the stylus with the successive records at variable points in the path of stylus travel.

47. A multiple record sound reproducing machine having sound reproducing mechanism, a plurality of records, and means for presenting said records in succession for engagement with said sound reproducing mechanism, said mechanism including a stylus having a variable length of travel.

48. A multiple record sound-reproducing machine, having a traveling sound box, means for advancing said sound box, means for holding said sound box in a position to disengage from said advancing means for its return movement, and means for changing the position of said holding means to vary the time of stylus engagement with the different records.

49. A multiple record sound-reproducing machine, having a traveling sound box, means for advancing the said sound box, a controller for holding the said sound box out of engagement with its advancing means during return movement, and means for adjusting said controller to vary the time of engagement with the advancing means for the different records.

50. A multiple record sound reproducing machine employing a stylus and having a stylus controller the application of the stylus to the record by the controller being dependent upon the location on the record of the beginning of the record groove or impression.

51. A multiple record sound reproducing machine having a plurality of records, a stylus, and means for varying in consecutive records and with reference to the character of successive sound records the time of application of the stylus to the record.

In testimony whereof, I have signed my name to this specification, in the presence of two subscribing witnesses.

GEORGE H. UNDERHILL.

Witnesses:
Thomas B. Booth,
Everett S. Emery.